(12) United States Patent
Dyck

(10) Patent No.: US 8,239,994 B2
(45) Date of Patent: Aug. 14, 2012

(54) SCRAPING ELEMENT FOR A PIPELINE PIG

(75) Inventor: John Dyck, Edmonton (CA)

(73) Assignee: Opus Services, Inc., Midland, TX (US)

( * ) Notice: Subject to any disclaimer, the term of this patent is extended or adjusted under 35 U.S.C. 154(b) by 885 days.

(21) Appl. No.: 11/971,261

(22) Filed: Jan. 9, 2008

(65) Prior Publication Data
US 2008/0184507 A1    Aug. 7, 2008

Related U.S. Application Data

(60) Provisional application No. 60/898,847, filed on Feb. 1, 2007, provisional application No. 60/904,980, filed on Mar. 5, 2007.

(51) Int. Cl.
*B08B 9/04* (2006.01)
*B08B 9/055* (2006.01)

(52) U.S. Cl. .................................................. 15/104.061

(58) Field of Classification Search .............. 15/104.061
See application file for complete search history.

(56) References Cited

U.S. PATENT DOCUMENTS

| | | | |
|---|---|---|---|
| 2,332,984 A | 10/1943 | Brackeen | |
| 2,640,213 A | 6/1953 | Robinson | |
| 2,958,884 A | 11/1960 | Hill et al. | |
| 3,496,588 A | 2/1970 | Ver Nooy | |
| 3,538,531 A * | 11/1970 | Knapp et al. | 15/104.061 |
| 3,576,043 A | 4/1971 | Zongker | |
| 3,605,159 A * | 9/1971 | Girard | 15/104.061 |
| 3,946,455 A * | 3/1976 | Echols et al. | 15/104.061 |
| 4,001,100 A | 1/1977 | Haydock | |
| 4,016,620 A | 4/1977 | Powers | |
| 4,083,074 A | 4/1978 | Curtis | |
| 4,242,771 A | 1/1981 | Knapp | |
| 4,244,073 A | 1/1981 | Sagawa | |
| 4,365,379 A * | 12/1982 | Neff | 15/104.061 |
| 4,506,401 A | 3/1985 | Knapp | |
| 4,720,884 A | 1/1988 | Ralls | |
| 4,825,498 A | 5/1989 | Rankin | |
| 4,913,629 A | 4/1990 | Gilfillan | |
| 4,937,907 A | 7/1990 | Antal | |
| 5,035,021 A | 7/1991 | Le Devehat | |
| 5,271,118 A * | 12/1993 | Piotrowitz | 15/104.061 |
| 5,473,787 A * | 12/1995 | Echols | 15/104.061 |
| 5,533,224 A * | 7/1996 | Knapp | 15/104.061 |
| 5,685,041 A * | 11/1997 | Sivacoe | 15/104.061 |
| 5,735,377 A | 4/1998 | Herren | |
| 5,903,945 A | 5/1999 | Lundie | |
| 5,924,158 A | 7/1999 | Watts | |
| 5,966,768 A | 10/1999 | Hahn | |
| 6,065,174 A | 5/2000 | Laymon | |
| 6,067,682 A | 5/2000 | Rankin | |

(Continued)

FOREIGN PATENT DOCUMENTS

GB              567658           2/1945

(Continued)

*Primary Examiner* — Randall Chin
(74) *Attorney, Agent, or Firm* — Davis & Bujold, P.L.L.C.

(57) ABSTRACT

A scraping element for a pipeline pig, includes a moulded body having a circular peripheral scraping edge circumscribing the body and adapted to engage an interior surface of a pipeline. The body is adapted to be mounted to a pipeline pig. A wear resistance material embedded in the scraping edge of the body.

17 Claims, 2 Drawing Sheets

U.S. PATENT DOCUMENTS 6,194,080 B1   2/2001   Stickling
6,381,797 B1 * 5/2002   Filippovitch et al. .... 15/104.061
6,500,271 B1   12/2002  Moore et al.
6,574,821 B1 * 6/2003   Dal Maso et al. ........ 15/104.061
7,000,280 B1   2/2006   Knapp

FOREIGN PATENT DOCUMENTS

GB              606137       8/1948

* cited by examiner

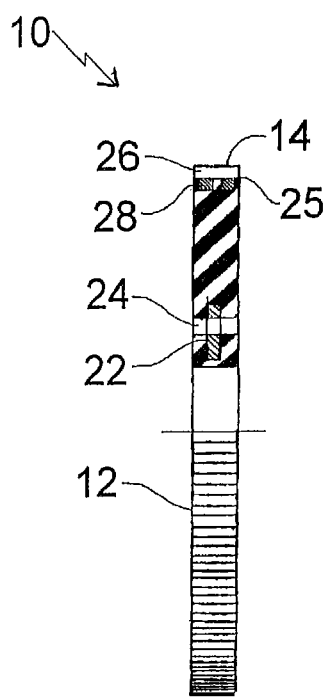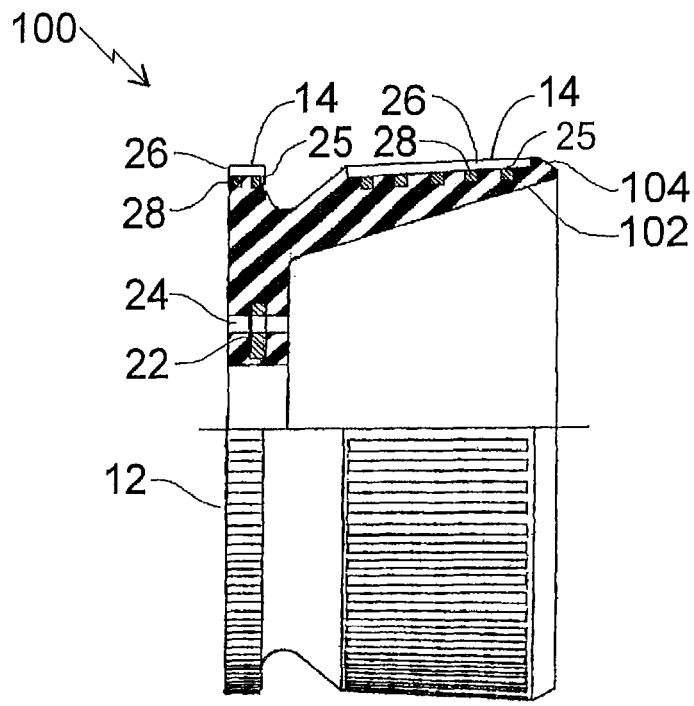
FIG. 1  FIG. 2
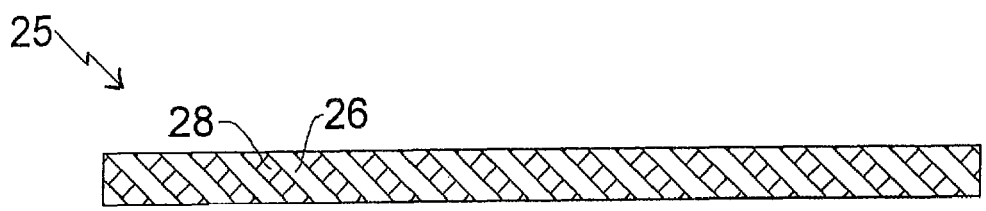
FIG. 3

SCRAPING ELEMENT FOR A PIPELINE PIG

FIELD

The present invention relates to a scraping element for a pipeline pig.

BACKGROUND

Scraping elements used with pipeline pigs are subject to wear and must be frequently replaced.

SUMMARY

There is provided a scraping element for a pipeline pig, which includes a moulded body having a circular peripheral scraping edge circumscribing the body and adapted to engage an interior surface of a pipeline. Means are provided for mounting the body to a pipeline pig. A wear resistant material is embedded in the scraping edge of the body.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein:

FIG. 1 is a partially cut away side elevation view of a disk-shaped scraper.

FIG. 2 is a partially cut away side elevation view of a cup-shaped scraper.

FIG. 3 is a top plan view of a form of belt with upstanding ribs when serve as wear strips when embedded in the scraper.

DETAILED DESCRIPTION

Figure 4:
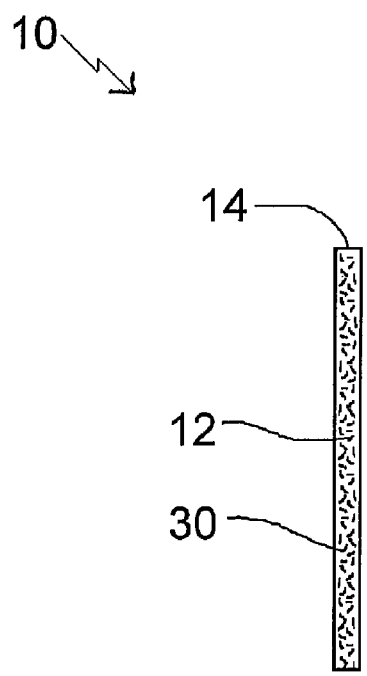
FIG. 4 is a side elevation view of a disk-shaped scraper with embedded particles.

A disk-shaped scraper generally identified by reference numeral 10, will now be described with reference to FIGS. 1, 3 and 4. A cup-shaped scraper, generally identified by reference numeral 100 will be described with reference to FIGS. 2 and 5. Each of the scrapers illustrated and described have a wear resistant material embedded in the scraping edge of the body, as will be hereinafter described.

Structure and Relationship of Parts:

Referring to FIG. 1, scraper 10 includes a disk-shaped body 12 moulded out of urethane that has a circular peripheral scraping edge 14 that circumscribes body 12 and is adapted to engage the interior surface of a pipeline. As scraper 10 is designed for use as a scraping element with a pipeline pig, scraper 10 may have various means for mounting body 12 to the pipeline pig. As depicted in FIG. 1, a reinforcing ring 22 with bolt holes 24 is used to mount body 12 to a pipeline pig. A belt 25 is embedded in scraping edge 14 of body 12. Belt 25 is made from a wear-resistant material, such as an ultra high molecular weight polyethylene (UHMW), or other suitable materials such as any of the thermo-plastics or thermo-sets, carbon-based materials, kevlars, nylons, ceramics, etc. Belt 25 as depicted has a plurality of upstanding ribs that serve as wear strips 26. The wear-resistant material is also designed to reduce friction relative to other materials commonly used with pipeline pigs, which also has the advantage of improving wear resistance. To securely embed belt 25 in the urethane, belt 25 may be made with ribs 28 on the other face as well, but with ribs 28 in a different orientation than wear strips 26. Wear strips 26 may be installed by embedding belt 25 at the time that the urethane is moulded, or by moulding the urethane first, and then pouring the wear-resistant material into the urethane. In FIG. 1, wear strips 26 are positioned in parallel spaced relation around the circumference of body 12, while ribs 28 are positioned perpendicular to wear strips 26. Wear strips 26 and ribs 28 may also have other orientations, as can be seen in FIG. 3, such that, when belt 25 is installed on body 12, ribs 28 and wear strips 26 would be diagonal instead of parallel or perpendicular, respectively, to scraping edge 14. Wear strips 26 may take various forms, such as skis, runners, wheel shaped forms, etc. that can be embedded into the urethane in order to reduce the friction and wear on body 12.

Referring to FIG. 4, instead of an embedded belt, particles 30 of a wear resistant material may be used. Particles 30 may be shredded, chopped, powdered, or shaved wear-resistant materials. These particles are introduced into the urethane during moulding such that they are throughout body 12, including on scraping edge 14, and therefore act as a wear-resistant, friction-reducing additive. Alternatively, body 12 may incorporate both belt 25 and particles 30.

Variations:

Pipeline pigs are propelled through a pipeline by fluids. One or more sealing cups on the pipeline pig are used to form a seal with interior walls of the pipeline to capture the fluids by which the pipeline pig is propelled. These sealing cups wear over time. Failure of a sealing cup during passage through a pipeline results in the pipeline pig at first experiencing diminished speed, with a portion of the fluids bypassing the sealing cup. Once sufficient wear occurs, the pipeline pig will stop altogether, becoming stranded within the pipeline, with the fluid bypassing the sealing cup. A variation will now be described in which the scraping element performs a dual role of a scraper element and a sealing cup, generally indicated by reference numeral 100.

Referring to FIG. 2, scraping element 100 includes a cup-shaped body 102 moulded out of urethane that has a circular peripheral scraping edge 14 circumscribing body 102 similar to scraping element 10 described above. Scraping element 100 also includes means, such as reinforcing ring 22 with bolt holes 24 for mounting body 12 to a pipeline pig, and wear resistant belt 25 with wear strips 26. Scraping element 100 has a tapered end 104 to allow it to be pumped bi-directionally in a pipeline. When travelling in the reverse direction, the thickness of the scraping portion of body 102 ought to be sufficient to ensure that body 12 does not tear from the pipeline pig when it encounters an obstacle in the pipeline, such as a partially closed valve or a large deposit of debris. In this embodiment, wear strips 26 (or particles or both, not shown) are positioned on both peripheral scraping edges 14, but could also be particles, or both. Wear strips 26 decrease the amount of friction between body 102 and the pipeline, such that body 102 does not wear as quickly which allows cup-shaped body 102 to maintain the seal for a longer period of time, and allows scraping edge 14 to scrape for a longer period of time. Wear strips 26 also allow scraping edge 14 to be thicker than usual (which generally increases the amount of friction on body 12) to allow for a more durable scraping element 100.

Figure 5:
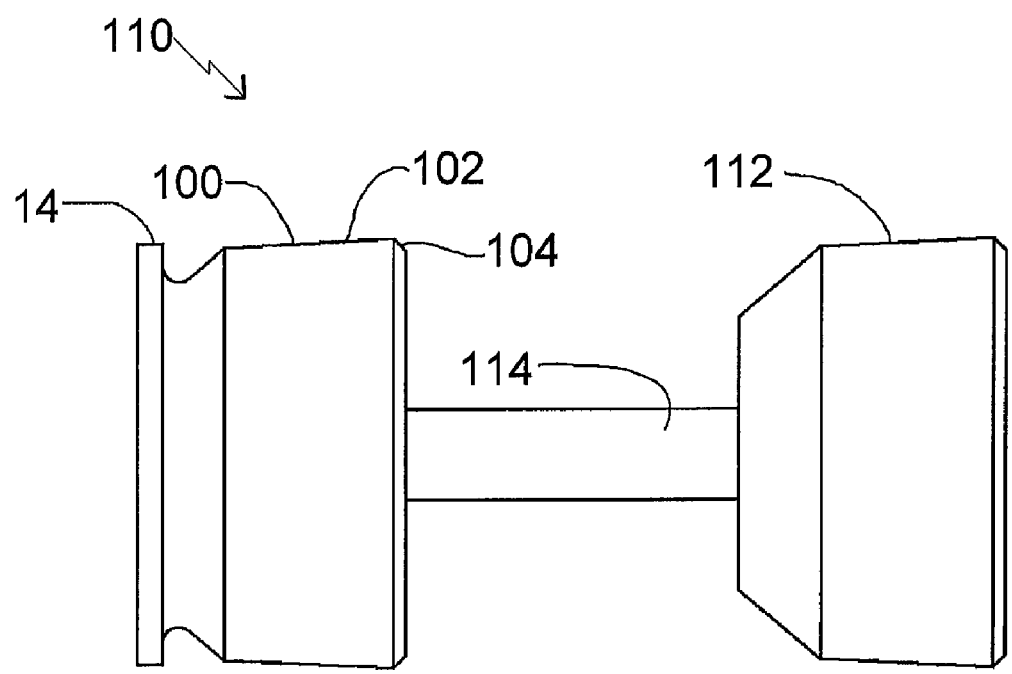
FIG. 5 is a side elevation view of a cup-shaped scraper attached to a pipeline pig.

Referring to FIG. 5, a pipeline pig 110 is shown with scraping element 100, and a cup-shaped scraper element 112. Scraper 112 does not have an integrally formed disk that acts as peripheral scraping edge 14, as it is primarily designed to follow such a scraper and act more as a carrier cup. To ensure its longevity, scraper 112 may be provided with wear strips, particles, or both (not shown). Scraping elements 100 and 112 are attached by a pig body 114, which may be made from flexible material, or otherwise formed to allow pipeline pig 110 to go around corners, as will be known in the art. The length of pig body 114 may also be adjustable to provide for pigs of different sizes and lengths. It will be understood that any combination of the above scrapers 10, 100 and 112 may be used to form pipeline pig 110, or other elements already used in the industry may be incorporated with any of these.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A scraping element for a pipeline pig, the scraping element comprising:
    a moulded body having a circular peripheral scraping edge circumscribing the body and adapted to engage an interior surface of a pipeline, and a cup shaped portion trailing the scraping edge and being separated from the scraping edge by a recessed portion, the circular peripheral scraping edge being carried by a disk-shaped portion of the moulded body, the disk-shaped portion, the recessed portion and the cup shaped portion being integrally formed in the moulded body;
    a mount for mounting the body to a pipeline pig; and
    a wear resistant material embedded in the scraping edge of the body.

2. The scraping element of claim 1, wherein the wear resistant material comprises wear strips positioned in parallel spaced relation around a circumference of the body.

3. The scraping element of claim 1, wherein the body is of urethane.

4. The scraping element of claim 1, wherein the wear resistant material is selected from a group consisting of an ultra high molecular weight polyethylene, a thermo-plastic, a thermo-set, a carbon-based material, kevlar, nylon, and ceramic.

5. The scraping element of claim 1, wherein the body comprises a substantially flat leading surface.

6. The scraping element of claim 1, wherein the wear resistant material is in the form of a belt having a plurality of upstanding ribs that serve as wear strips.

7. The scraping element of claim 1, wherein the wear resistant material is particles.

8. The scraping element of claim 1, wherein the scraping element further comprising at least one trailing cup shaped body, a flexible body couples the at least one trailing cup shaped body with the moulded body in an axially spaced relationship.

9. The scraping element of claim 8, wherein a leading surface of the trailing cup shaped body, facing the moulded body, is beveled.

10. A scraping element for a pipeline pig, the scraping element comprising:
    a disk-shaped body moulded out of urethane having a circular peripheral scraping edge circumscribing the body and adapted to engage with an interior surface of a pipeline, and a cup shaped portion trailing the scraping edge and being separated from the scraping edge by a recessed portion;
    a mount for mounting the body to a pipeline pig;
    a belt embedded in the scraping edge of the body, the belt being made from a wear-resistant material selected from a group consisting of an ultra high molecular weight polyethylene, a thermo-plastic, a thermo-set, a carbon-based material, kevlar, nylon, and ceramic, the belt having a plurality of upstanding ribs that serve as wear strips, and the wear strips being positioned in parallel spaced relation around a circumference of the body.

11. The scraping element of claim 10, wherein the scraping element further comprising at least one trailing cup shaped body, a flexible body couples the at least one trailing cup shaped body with the disk-shaped body in an axially spaced relationship.

12. The scraping element of claim 11, wherein a leading surface of the trailing cup shaped body, facing the disk-shaped body, is beveled.

13. The scraping element of claim 10, wherein the circular peripheral scraping edge is carried by a disk-shaped portion of the disk-shaped body, and the disk-shaped portion, the recessed portion and the cup shaped portion being integrally formed in the disk-shaped body.

14. A scraping element for a pipeline pig, the scraping element comprising:
    a cup-shaped body moulded out of urethane having a circular peripheral scraping edge circumscribing the body and adapted to engage an interior surface of a pipeline, and a cup shaped portion trailing the scraping edge and being separated from the scraping edge by a recessed portion;
    a mount for mounting the body to a pipeline pig;
    a belt embedded in the scraping edge of the body, the belt being made from a wear-resistant material selected from a group consisting of ultra high molecular weight polyethylene, thermo-plastic, thermo-set, a carbon-based material, kevlar, nylon, and ceramic, the belt having a plurality of upstanding ribs that serve as wear strips, and the wear strips being positioned in parallel spaced relation around a circumference of the body.

15. The scraping element of claim 14, wherein the circular peripheral scraping edge is carried by a disk-shaped portion of the cup-shaped body, and the disk-shaped portion, the recessed portion and the cup shaped portion being integrally formed in the cup-shaped body.

16. A scraping element for a pipeline pig, the scraping element comprising:
    a moulded body having a circular peripheral scraping edge circumscribing the body and adapted to engage an interior surface of a pipeline, and a cup shaped portion trailing the scraping edge and being separated from the scraping edge by a recessed portion, the circular peripheral scraping edge being carried by a disk-shaped portion of the moulded body, the disk-shaped portion, the recessed portion and the cup shaped portion being integrally formed in the moulded body;
    a mount for mounting the body to a pipeline pig; and
    particles of wear-resistant material being embedded in the scraping edge of the body.

17. A scraping element for a pipeline pig, comprising:
    a moulded body having a circular peripheral scraping edge circumscribing the body and adapted to engage an interior surface of a pipeline and a cup shaped portion trailing the scraping edge and separated from the scraping edge by a recessed portion;
    a mount for mounting the body to a pipeline pig; and
    a wear resistant material embedded in the scraping edge of the body, the wear resistant material being in the form of a belt having a plurality of upstanding ribs that serve as wear strips.

\* \* \* \* \*